United States Patent Office 3,437,661
Patented Apr. 8, 1969

3,437,661
PROCESS OF PRODUCING PURINE
DERIVATIVES
Yasuo Fujimoto and Masayuki Teranishi, Tokyo, Japan,
assignors to Kyowa Hakko Kogyo Co., Ltd., Tokyo,
Japan, a corporation of Japan
No Drawing. Filed Jan. 15, 1965, Ser. No. 425,937
Claims priority, application Japan, Jan. 18, 1964
39/1,944
Int. Cl. C07d 57/38; C07c 113/00
U.S. Cl. 260—252                                10 Claims

ABSTRACT OF THE DISCLOSURE

A process for synthesizing a purine derivative from an α-arylazocyanoacetyl derivative by carrying out a sequence of pyrimidine formation by reaction with urea, thiourea or an amidine, reduction, formylation and imidazole ring formation steps in a continuous manner without the isolation of any intermediate products. Purines such as hypoxanthine, guanine, xanthine and derivatives thereof are prepared by this process.

This invention relates to a novel process of producing purine derivatives such as hypoxanthine, guanine, xanthine, and derivatives there of characterized in that the step of (a) condensing an α-arylazocyanoacetyl derivative (2-arylazocyanoacetyl derivative) of the general formula

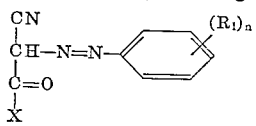

wherein X stands for —NH$_2$, —NHNH$_2$, —NHOH, lower alkylamino, —OH or lower alkoxy, each R$_1$ is independently H, lower alkyl, hydroxyl, lower alkoxy, halogen, nitro, SO$_3$H or carboxyl and n is 1, 2 or 3, with urea, thiourea or amidine of the formula

wherein R$_2$ stands for H, amino, alkyl-mercapto, lower alkyl, aryl, substituted aryl, lower alkoxy, β-pyridyl, or aryl-alkyl, or with an acid addition salt thereof, to produce the corresponding 4-amino-5-arylazopyrimidine derivative, (b) reducing the said derivative by means of a reducing agent comprising reducing sulfur compounds, reducing metals, reducing metal salts, reducing catalysts, hydrides and hydrazines or by means of catalytic hydrogenation using one or more hydrogenating catalysts under a pressure of hydrogen, effected directly without isolating or purifying the said resulting derivative, and (c) the step of closing the imidazole ring (effecting purine formation) by heating the reaction mixture in the presence of one or more formamides, formamidines and/or acid addition salts thereof, formic acid and/or esters and/or salts thereof, dialkoxy methyl esters of organic acids, formimido esters and ortho esters of orthoformic acid or a mixture of one of these with one or more acid anhydrides, ammonia, ketene derivatives, salts of organic acids and/or nitriles, are carried out successively and continuously in a single stage without isolating any intermediates.

According to the present invention, hypoxanthine, for example, can be prepared as represented by the following chemical reactions:

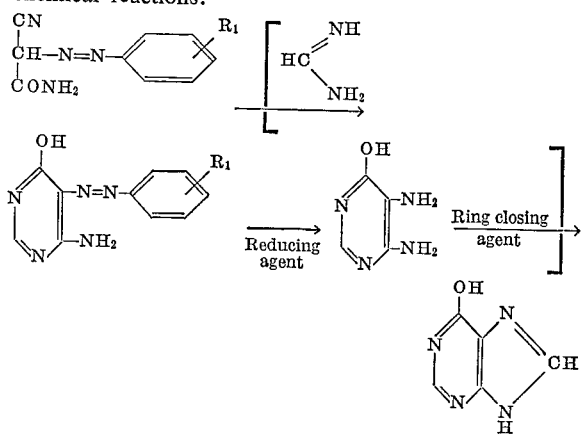

According to an embodied process of the present invention, purine derivatives may be recovered in high yields through a single stage process including the reaction between an α-arylazocyanoacetyl derivative (2-arylazocyanoacetyl derivative) and a urea, a thiourea or an amidine derivative using or not using a suitable solvent or diluent or in the presence of a suitable condensation agent at an appropriate temperature, reduction of the resulting arylazo group with an appropriate reducing agent with or without an additional amount of solvent at a suitable temperature, and heating with stirring for effecting imidazole ring closure or purine ring formation with or without the aid of an appropriate imidazole ring closing agent.

Although the reactions of the present invention should preferably be carried out in an inert atmosphere such as nitrogen, sufficiently pure purine derivatives may be obtained even if the reactions are carried out without such protection. Furthermore, a suitable diluent or an organic solvent which forms an azeotropic mixture with water may be used for removing water as formed during the course of the reaction.

Amidine derivatives, one of the starting materials in the present process, are guanidine, S-alkylthiourea, formamidine and other lower alkylamidines, arylamidines such as phenylamidine, p-methoxyphenylamidine and β-pyridyl amidine and inorganic acid addition salts thereof such as hydrochlorides, nitrates, carbonates and sulfates and organic acid addition salts such as formate, acetate and propionate.

Various inert organic solvents which do not inhibit the reaction may be employed as a reaction medium or diluent, but those capable of dissolving the reaction products may be advantageously used as usual in general organic reactions and generally are selected according to the kind of condensation agent to be used. The usually employable organic solvents are as follows: alcohols including hexanol, cyclohexanol, pentanol, butanol, propanol, ethanol, furfuryl alcohol, tetrahydrofurfuryl alcohol, benzyl alcohol, ethylene glycol, propylene glycol and glycerol; ethers including butyl ether, amyl ether, dioxanes, anisol, phenethol, tetrahydrofuran, ethylene glycol dialkyl ethers, polyethylene glycol dialkyl ethers such as diethylene glycol dialkyl ethers and triethylene glycol dialkyl ethers, propylene glycol dialkyl ethers, polypropylene glycol dialkyl ethers such as dipropylene glycol dialkyl ethers and tripropylene glycol dialkyl ethers and the like; alcohol ethers including various ethylene glycol monoalkyl ethers, propylene glycol monoalkyl ethers, polyethylene glycols such as diethylene glycol and triethylene glycol, polypropylene glycols such as dipropylene glycol and tripropylene glycol, polyethylene glycol monoalkyl ethers such as diethylene glycol monoalkyl ethers and triethylene glycol monoalkyl ethers, polypropylene glycol monoalkyl ethers such as dipropylene glycol monoalkyl ethers and tripropylene glycol monoalkyl ethers and the like; ketones including cyclohexanone and dibutyl ketone; esters including esters of formic acid, esters of acetic acid, ethylene glycol monoesters of carboxylic acids, polyethylene glycol monoesters of carboxylic acids such as diethylene glycol monoesters of carboxylic acids, ethylene glycol diesters of carboxylic acids, polyethylene glycol diesters of carboxylic acids such as diethylene glycol diesters of carboxylic acids, propylene glycol diesters of carboxylic acids, polypropylene glycol diesters of carboxylic acids such as dipropylene glycol diesters of carboxylic acids, propylene glycol monoesters of carboxylic acids, polypropylene glycol monoesters of carboxylic acids such as dipropylene glycol monoesters of carboxylic acids, ethylene glycol monoalkyl ether carboxylic acid monoesters, polyethylene glycol monoalkyl ether carboxylic acid monoesters such as diethylene glycol monoalkyl ether carboxylic acid monoesters, propylene glycol monoalkyl ether carboxylic acid monoesters, polypropylene glycol monoalkyl ether carboxylic acid monoesters such as dipropylene glycol monoalkyl ether carboxylic monoesters; hydrocarbons including benzene, toluene and xylene; organic acids including formic acid and acetic acid; formamides including formamide and dimethyl formamide; pyridines including pyridine and 5-ethyl-2-methyl pyridine; piperidines; and nitromethane, used singly or in combination.

Usually employable condensation agents are as follows: metal alkoxide, piperidine, diethylamine, triethylamine and the like, used singly or in combination.

As reducing agents, the following agents may be used singly or in combination: sulfur compounds with reducing activity including dithionites such as sodium dithionite (sodium hydrosulfite), thiosulfates such as ammonium thiosulfate, lithium thiosulfate, sodium thiosulfate, potassium thiosulfate, magnesium thiosulfate, calcium thiosulfate and barium thiosulfate, sulfites such as ammonium sulfite, potassium sulfite, sodium sulfite, lithium sulfite, calcium sulfite, barium sulfite, ammonium hydrogen sulfite, sodium hydrogen sulfite, potassium hydrogen sulfite, sodium pyrosulfite, and potassium pyrosulfite, sulfides such as ammonium sulfide, lithium sulfide, sodium sulfide, potassium sulfide, magnesium sulfide, calcium sulfide and barium sulfide, hydrosulfides such as ammonium hydrosulfide, sodium hydrosulfide, potassium hydrosulfide, calcium hydrosulfide and barium hydrosulfide, polysulfides such as ammonium pentasulfide, sodium pentasulfide, potassium pentasulfide, barium pentasulfide, sodium tetrasulfide, potassium tetrasulfide, potassium trisulfide, barium trisulfide, potassium disulfide, ammonium polysulfide, sodium polysulfide and potassium polysulfide, organic dithionites such as formaldehyde sodium sulfoxylate dihydrate (rongalit), and organic sulfites such as formaldehyde sodium hydrogen sulfite; reducing metals including zinc, tin, amalgamated aluminum, Raney alloys; reducing metal salts including stannous dichloride, titanium dichloride; hydrides including sodium borohydride, lithium aluminum hydride, lithium hydride, calcium hydride, sodium hydride and titanium hydride; hydrazines including hydrazine sulfate, hydrazine hydrochloride and hyrazine hydrate; and reducing catalysts including hydrogen-adsorbed Raney nickel and hydrogen-adsorbed Raney cobalt. In addition, hydrogenating catalysts including palladium catalysts such as Pd-carbon, Pd-silk, Pd-asbestos, Pd-black and $PdCl_2$, nickel catalysts such as Raney nickel, cobalt catalysts such as Raney cobalt and a mixture of two or more reducing catalysts can be used in an atmosphere of hydrogen.

Usually employable imidazole ring closing agents are as follows: formamides; amidines and their acid addition salts such as formamidine and acetamidine and salts thereof; formic acid and esters and salts thereof; dialkoxy-dimethyl esters of organic acids such as diethoxymethylacetate; formimino esters (formimido esters or formimido ethers) such as ethylformimino ester and isopentylformimino ester; and orthoformic esters, used singly or in combination. Furthermore, if desired, one or more of the above mentioned members may be used in admixture with one or more members selected from the group including ammonia, salts of organic acids, acid anhydrides, ketene homologues such as ketene and diethyl ketene and nitriles such as acetonitrile. These condensation agents may be introduced into the reaction mixture simultaneously or successively in any order. When the solvent used in the reduction serves as a ring closing agent as in the cases of using formamides, formic acid and formic esters, the addition of condensation agents after reduction is not always necessary.

The first reaction, pyrimidine ring formation, may be effected at ordinary temperatures (15° to 30° C.) with the aid of appropriate condensation agents, but, in the case of using no condensation agents, higher temperatures are more desirable.

The second reaction, reduction, may be effected at ordinary temperatures, but higher temperatures are capable of reducing the amount of some catalysts such as hydrosulfites and rongalite in formamide. In the catalytic hydrogenation using catalysts, carrying out the hydrogenation at higher temperatures under an atmosphere of hydrogen in a closed system is desirable.

The third reaction, imidazole ring closure, should preferably be effected at temperatures above 100° C.

The purine derivatives thus obtained are known and are very important as starting materials for the preparation of seasoning agents or pharmaceutical agents.

The following specific examples represent presently preferred embodiments but are for illustrative purposes only and should not be construed as limiting the spirit and the scope of the present invention. In these examples the relation between parts by weight and parts by volume is as that between grams and milliliters.

EXAMPLE 1

A mixture of 5.7 parts by weight of 2-phenylazocyano acetamide and 7.0 parts by weight of formamidine acetate in 50 parts by volume of ethylene glycol mono-ethyl ether (ethyl Cellosolve) is heated at reflux for 3 hours and thereafter 20 parts by volume of formamide and 2–4 parts by weight of sodium hydrosulfite are added portionwise into the mixture with stirring over a period of 20 minutes at 110°–130° C. After this addition, the mixture is maintained at this range of temperature for 30 minutes, further stirred at 170°–190° C. for about 3 hours, cooled, treated with 200–300 parts by volume of water and filtered while hot. The filtrate is treated with activated carbon, concentrated and allowed to stand overnight in a refrigerator. The resulting precipitate is collected by filtration and recrystallized from water to give 2.4 parts by weight of free hypoxanthine.

*Elemental analysis.*—Calculated for $C_5H_4N_4O$: C, 44.12; H, 2.96; N, 41.17. Found: C, 44.36; H, 3.03; N, 41.35.

EXAMPLE 2

A mixture prepared by adding 4.2 parts by weight of ethyl 2-(p-hydroxyphenylazo) cyanoacetate and 2.7 parts by weight of sodium ethoxide to 80 parts by volume of anhydrous amyl alcohol, followed by 1.6 parts by weight of thiourea is boiled for 2 hours and thereafter 8 to 12 parts by weight of sodium hydrosulfite is added in small portions over a period of 20 minutes at 110°–120° C. while stirring. After this addition, the reaction mixture is maintained at this temperature for a further 30 minutes, and 2.0–4.0 parts by weight of formamidine acetate is added, and the mixture is heated at reflux for about 2 hours, cooled, diluted with 50 parts by volume of water, adjusted to pH 7–8, and allowed to stand overnight in a refrigerator. The separating precipitate is collected by filtration, dissolved in aqueous ammonia and neutralized with acetic acid. The precipitate is recrystallized from water to give 2.7 parts by weight of 2-mercapto-hypoxanthine.

Elemental analysis.—Calculated for $C_5H_4ON_4S$: C, 35.72; H, 2.40; N, 33.33. Found: C, 36.15; H, 2.09; N, 33.23.

EXAMPLE 3

A mixture prepared by adding 4.4 parts by weight of ethyl 2-(p-methylphenylazo) cyanoacetate and 2.2 parts by weight of guanidine carbonate to a solution of 0.9 to 0.95 parts by weight of sodium in 30 parts by volume of ethanol is stirred for 30 minutes at room temperature and heated at reflux for about 2 hours. Thereafter, the reaction mixture is cooled and treated with 50 parts by volume of formamide and 1 to 2 parts by volume of formic acid followed by 1 to 3 parts by weight of Raney nickel catalyst and heated with stirring at about 100°–120° C. under a pressure of hydrogen (about 60 atm.). When the absorption of hydrogen has nearly come to an end, the reaction mixture is heated to about 170° C. and kept at this temperature for about 2 hours. After cooling, the separating precipitate is collected by filtration, dissolved in aqueous alkali and filtered to remove catalyst. The filtrate is neutralized with acid and separating crystals are collected. Recrystallization from hot water gave 2.4 parts by weight of guanine.

Elemental analysis.—Calculated for $C_5H_5N_5O$: C, 39.73; H, 3.33; N, 46.34. Found: C, 39.84; H, 3.51; N, 46.67.

EXAMPLE 4

A mixture prepared by adding 5.0 parts by weight of ethyl 2-(m-nitrophenylazo) cyanoacetate and 1.2 parts by weight of urea and then 1.1 parts by weight of sodium methoxide to 50 parts by volume of ethylene glycol diethyl ether is heated at reflux for 2 hours on a water bath, thereafter added with 30 parts by volume of N,N'-dimethylformamide and maintained at 110°–130° C., lower boiling fractions being removed by distillation. The reaction mixture is stirred at 110°–130° C. and treated with 5–10 parts by weight of sodium thiosulfate which is added in small portions over a period of about 10–15 minutes. After this addition, the mixture is maintained at this temperature for about 30 minutes, cooled, added with 15 parts by volume of ethyl orthoformate, 40 parts by volume of 15% ethanolic ammonia and 5 parts by weight of ammonium formate, again heated with stirring at 150°–180° C. for about 2 hours and, after this period, the reaction mixture is concentrated and diluted with 300–400 parts by volume of water and finally filtered while hot. The filtrate is treated with activated carbon while hot. The filtrate is concentrated and allowed to stand overnight in a refrigerator. The separating crystals are collected by filtration and recrystallized from water to give 2.0 parts by weight of xanthine.

Elemental analysis.—Calculated for $C_5H_4N_4O_2$: C, 39.48; H, 2.65; N, 36.84. Found: C, 39.70; H, 2.60; N, 36.83.

EXAMPLE 5

A mixture prepared by adding 4.2 parts by weight of N-(2-phenylazocyanoacetyl) hydroxylamine and 3.5 parts by weight of S-methylthiourea sulfate to 50 parts by volume of anhydrous ethyl carbitol containing 0.9–1.0 part by weight of sodium dissolved therein is stirred at room temperature for about 10 minutes, heated at reflux for about 2 hours and, while still maintaining the refluxing condition, treated with 5–10 parts by weight of sodium polysulfide which is added in small portions over a period of 10–15 minutes, further refluxed for about 30 minutes and treated with 4–6 parts by weight of ethylformimino ether hydrochloride dissolved in a small amount of anhydrous pentanol and simultaneously with dry gaseous ammonia that is rapidly passed through the mixture during a period of about 30 minutes. Then the reactor is closed and heated at about 160°–180° C. for 2–3 hours. After cooling the reaction mixture, 100 parts by volume of water is added. Separating precipitate is collected by filtration, dissolved in 100–200 parts by volume of 1–2 normal aqueous alkali and filtered. The filtrate is neutralized with 1–2 normal hydrochloric acid and the resultant precipitate is collected and recrystallized from water to give 2.2 parts by weight of 2-methylmercaptohypoxanthine.

Elemental analysis.—Calculated for $C_6H_6ON_4$: C, 48.00; H, 4.03; N, 37.32. Found: C, 48.12; H, 4.21; N, 37.40.

EXAMPLE 6

A mixture prepared by adding 3.8 parts by weight of 2-phenylazocyanoacetamide and 3.0 parts by weight of acetamidine hydrochloride to 50 parts by volume of ethyl carbitol followed by 1.4 parts by weight of sodium ethoxide is stirred at room temperature for about 30 minutes, heated at about 150° C. for about 3 hours, treated with 5.0–8.0 parts by weight of rongalite added gradually at 110°–130° C., the mixture further maintained at this temperature range for about 30–60 minutes, treated with 30–45 parts by volume of diethoxymethyl acetate and heated at 150°–180° C. for about one hour. Then the reaction mixture is concentrated to dryness, treated with 150–200 parts by volume of water and filtered while hot. The filtrate is treated with activated carbon, allowed to stand overnight in a refrigerator, and separating crystals collected by filtration to give 2.1 parts by weight of 2-methylhypoxanthine.

Elemental analysis.—Calculated for $C_6H_6N_4O$: C, 48.00; H, 4.03; N, 37.22. Found: C, 47.92; H, 4.12; N, 37.18.

EXAMPLE 7

A mixture prepared by adding 4.6 parts by weight of 2-(o-nitrophenylazo)-cyanoacetamide and 2.0–4.0 parts by weight of formamidine actate to a mixed solution of 5.0 parts by volume of xylene and 30 parts by volume of formamide is heated at reflux for about 4–5 hours. Then the mixture is catalytically hydrogenated at 110°–130° C. by stirring under pressure of hydrogen (initial pressure: 50 atm.) with 1–2 parts by weight of 10% Pd-on-carbon. After the rapidly proceeding absorption has stopped, the reaction mixture is cooled, added with 3.5 parts by weight of ethyl orthoformate and 70 parts by volume of acetone saturated with ketene, heated with stirring at 150°–170° C. for about 4 hours, cooled, treated with 100–150 parts by volume of 2–3 normal aqueous alkali and filtered. The filtrate is neutralized with 2–3 normal sulfuric acid, treated with activated carbon while hot and allowed to stand overnight in a refrigerator. The separating crystals are collected to give 2.4 parts by weight of hypoxanthine.

EXAMPLE 8

A mixture prepared by adding 3.5 parts by weight of ethyl 2-phenylazocyanoacetate and 12.0–13.0 parts by weight of urea to 50 parts by volume of butyl carbitol (diethylene glycol monobutyl ether) containing 1.4–2.0 parts by weight of sodium ethoxide is heated at 120°–130° C. for about 3 hours and thereafter heated at reflux for about 5–8 hours with 50 parts by volume of 98% formic acid and 4–5 parts by weight of zinc powder added successively. After this period, the reaction mixture is cooled, added with 300–500 parts by volume of water, neutralized and filtered while hot. The filtrate is concentrated under reduced pressure, the separating precipitate dissolved once in 2–3 normal aqueous alkali and neutralized with 2–3 normal sulfuric acid to give 2.2 parts by weight of xanthine.

EXAMPLE 9

A mixture containing 3.7 parts by weight of 2-phenylazocyanoacetamide and 2.0–4.0 parts by weight of formamidine acetate in 50 parts by volume of pyridine is refluxed for about 3 hours. Thereafter, the reaction mixture is stirred, diluted with 20 parts by volume of formamide and 30 parts by volume of formic acid, and 2.0–4.0 parts by weight of sodium hydrosulfite is added in portions over a period of 20 minutes, again refluxed for about 8–10 hours and worked up as shown in the Example 1 above to give 2.0 parts by weight of hypoxanthine.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for the production of a purine derivative which comprises the steps of preparing a 4-amino-5-arylazopyrimidine derivative by condensing an arylazocyanoacetyl compound of the formula:

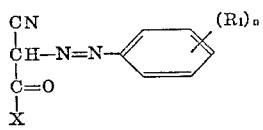

wherein X is a member selected from the group consisting of $-NH_2$, $-NHNH_2$, $-NHOH$, lower alkylamino, $-OH$ and lower alkoxy, and each $R_1$ is independently selected from the group consisting of H, lower alkyl, hydroxyl, lower alkoxy, halogen, nitro, $SO_3H$ and carboxyl, and $n$ is one of the integers 1, 2 and 3, with a member selected from the group consisting of urea, thiourea and compounds of the formula:

and acid addition salts thereof, wherein $R_2$ is a member selected from the group consisting of H, amino, lower alkylmercapto, lower alkyl, phenyl, lower alkoxyphenyl, lower alkyl-substituted phenyl, lower alkoxy, $\beta$-pyridyl, phenyl-(lower)alkyl and lower alkyl-substituted phenyl-(lower)alkyl, subjecting said 4-amino-5-arylazopyrimidine derivative to the action of a reducing agent selected from the group consisting of reducing sulfur compounds selected from the group consisting of dithionites, thiosulfates, sulfites, sulfides, hydrosulfides, and polysulfides, reducing metals selected from the group consisting of zinc, tin, amalgamated aluminum and Raney alloys, reducing metal salts selected from the group consisting of stannous dichloride and titanium dichloride, hydrides, hydrazines selected from the group consisting of hydrazine sulfate, hydrazine hydrochloride and hydrazine hydrate and reducing catalysts selected from the group consisting of hydrogen-adsorbed Raney nickel and hydrogen-adsorbed Raney cobalt, or to catalytic hydrogenation with a palladium or nickel catalyst under pressure, and subjecting the obtained reduced product to thermal ring closure by heating the reaction mixture to a temperature of at least 100° C. in the presence of at least one compound selected from the group consisting of formamide, formamidine, esters and salts thereof, dialkoxy methyl esters of organic carboxylic acids and formimido esters and ortho esters of orthoformic acid to form the objective purine derivative, said steps being carried out continuously without isolating any intermediates.

2. A process for the production of hypoxanthine, which comprises heating a mixture of 2-phenylazocyano acetamide with formamidine acetate in an inert organic solvent therefor, subjecting the thus-obtained condensation product to reduction with sodium hydrosulfite after adding formamide at 110°–130° C., and then effecting ring closure by heating the obtained reduced product to 170°–190° C., all said steps being carried out without isolation of formed intermediates or any other compounds.

3. A process for the production of 2-mercaptohypoxanthine, which comprises heating a mixture of ethyl 2-(p-hydroxyphenylazo)-cyanoacetate and thiourea in an inert organic solvent therefor, subjecting the thus-obtained condensation product to reduction with sodium hydrosulfite at 110°–120° C., and then effecting ring closure after adding formamidine acetate by heating the obtained reduced product at reflux, all said steps being carried out without isolation of formed intermediates.

4. A process for the production of guanine which comprises heating a mixture of ethyl 2-(p-methylphenylazo)-cyanoacetate and guanidine carbonate in an inert organic solvent therefor, subjecting the thus-obtained condensation product to reduction by catalytic hydrogenation after adding formamide and formic acid, and then effecting ring closure by heating the obtained reduced product to about 170° C., all said steps being carried out without isolation of formed intermediates.

5. A process for the production of xanthine which comprises heating a mixture of ethyl 2-(m-nitrophenylazo)-cyanoacetate and urea in an inert organic solvent therefor, subjecting the thus-obtained condensation product to reduction with sodium thiosulfate at 110°–130° C., and then effecting ring closure after adding ethyl orthoformate, 15% ethanolic ammonia and ammonium formate by heating the obtained reduced product to about 150°–180° C., all said steps being carried out without isolation of formed intermediates.

6. A process for the production of 2-methylmercaptohypoxanthine which comprises heating a mixture of N-(2-phenylazocyanoacetyl)-hydroxylamine and S-methylthiourea sulfate in an inert organic solvent therefor, subjecting the thus-obtained condensation product to reduction with sodium polysulfide at reflux, and then effecting ring closure after adding ethylformimino ether hydrochloride in pentanol and ammonia by heating the obtained reduced product to about 160°–180° C., all said steps being carried out without isolation of formed intermediates.

7. A process for the production of 2-methylhypoxanthine which comprises heating a mixture of 2-phenylazo cyanoacetamide and acetamidine hydrochloride in an inert organic solvent therefor, subjecting the thus-obtained condensation product to reduction with rongalit at 110°–130° C., and then effecting thermal ring closure of the obtained reduced product after adding diethoxymethyl acetate, all said steps being carried out without isolation of formed intermediates.

8. A process for the production of hypoxanthine which comprises heating 2-(o-nitrophenylazo)-cyanoacetamide and formamidine acetate in an inert organic solvent therefor, subjecting the thus-obtained condensation product to reduction by catalytic hydrogenation at 110°–130° C., and then effecting ring closure after adding ethyl orthoformate and acetone saturated with ketone by heating the obtained reduced product to about 150°–170° C., all said steps being carried out without isolation of formed intermediates.

9. A process for the production of xanthine which comprises heating a mixture of ethyl 2-phenylazocyanoacetate and urea in an inert organic solvent therefor, subjecting the thus-obtained condensation product to reduction with 98% formic acid and zinc powder at reflux, and effecting thermal ring closure of the obtained reduced product, all said steps being carried out without isolation of formed intermediates or any other compounds.

10. A process for the production of hypoxanthine which comprises heating a mixture of 2-phenylazocyanoacetamide and formamidine in an inert organic solvent therefor, subjecting the thus-obtained condensation product to reduction with sodium hydrosulfite after adding formamide and formic acid at reflux, and effecting thermal ring closure of the obtained reduced product, all said steps being carried out without isolation of formed intermediates.

References Cited

UNITED STATES PATENTS 2,785,163  3/1957  Swidinsky et al. __ 260—256 XR
3,042,648  7/1962  Lewis _____ 260—154 XR

FOREIGN PATENTS 953,897  4/1964  Great Britain.
15,038  7/1965  Japan.

OTHER REFERENCES

Giner-Sorolla et al., J. Am. Chem. Soc., vol. 80, pp. 5744 to 5752 (1958) QD1. A5.

Koppel et al., J.A.C.S., vol. 81, pp. 3046–3051 (1959) QD1. A5.

FLOYD D. HIGEL, *Primary Examiner.*

U.S. Cl. X.R.

260—154, 193, 256, 256.4

U.S. DEPARTMENT OF COMMERCE
PATENT OFFICE
Washington, D.C. 20231

UNITED STATES PATENT OFFICE
CERTIFICATE OF CORRECTION

Patent No. 3,437,661                                                     April 8, 1969

Yasuo Fujimoto et al.

It is certified that error appears in the above identified patent and that said Letters Patent are hereby corrected as shown below:

In the heading to the printed specification, line 9, "39/1,944" should read -- 39/1,994 --.

Signed and sealed this 21st day of April 1970.

(SEAL)
Attest:

Edward M. Fletcher, Jr.                               WILLIAM E. SCHUYLER, JR.
Attesting Officer                                                     Commissioner of Patents